(12) United States Patent
Hachitani et al.

(10) Patent No.: US 8,077,406 B2
(45) Date of Patent: Dec. 13, 2011

(54) ON-VEHICLE CAMERA LENS GLASS MATERIAL AND ON-VEHICLE CAMERA LENS

(75) Inventors: Yoichi Hachitani, Tokyo (JP); Kazuo Tachiwana, Tokyo (JP)

(73) Assignee: Hoya Corporation, Tokyo (JP)

( * ) Notice: Subject to any disclaimer, the term of this patent is extended or adjusted under 35 U.S.C. 154(b) by 602 days.

(21) Appl. No.: 12/050,985

(22) Filed: Mar. 19, 2008

(65) Prior Publication Data
US 2008/0231972 A1   Sep. 25, 2008

(30) Foreign Application Priority Data
Mar. 20, 2007   (JP) ............................... P. 2007-073182

(51) Int. Cl.
*G02B 3/00* (2006.01)
(52) U.S. Cl. ..................................................... 359/809
(58) Field of Classification Search .................. 359/809; 501/11
See application file for complete search history.

(56) References Cited

U.S. PATENT DOCUMENTS

| | | | | |
|---|---|---|---|---|
| 4,093,364 A | * | 6/1978 | Miller | 352/132 |
| 4,771,020 A | * | 9/1988 | Omata et al. | 501/42 |
| 7,250,383 B2 | * | 7/2007 | Inoue et al. | 501/55 |
| 7,659,222 B2 | * | 2/2010 | Shimizu | 501/78 |
| 7,713,632 B2 | * | 5/2010 | Krisko et al. | 428/432 |
| 2002/0065186 A1 | * | 5/2002 | Yoshii et al. | 501/63 |
| 2003/0164004 A1 | * | 9/2003 | Hirota et al. | 65/29.16 |
| 2003/0191007 A1 | * | 10/2003 | Mashiko et al. | 501/65 |
| 2006/0088269 A1 | * | 4/2006 | Higby | 385/142 |
| 2006/0199721 A1 | * | 9/2006 | Kishimoto et al. | 501/75 |
| 2008/0220961 A1 | * | 9/2008 | Uehara et al. | 501/78 |

FOREIGN PATENT DOCUMENTS

| | | |
|---|---|---|
| CN | 1704369 A | 12/2005 |
| DE | 3130066 A1 | 2/1983 |
| DE | 102005051777 A1 | 6/2006 |
| EP | 1245544 A2 | 10/2002 |
| EP | 1604959 A1 | 12/2005 |
| FR | 2546159 A1 | 11/1984 |
| JP | 2006-11093 A | 1/2006 |

OTHER PUBLICATIONS

Database WPI Week 198219, Thomson Scientific, London, GB; AN 1982-38375E (XP002493645).
Database WPI Week 198043, Thomson Scientific, London, GB; AN 1980-75777C (XP002493646).
"Optical glass contg. no cadmium oxide-comprises oxides of boron, lanthanum, zinc, niobium and zirconium" Derwent, Jan. 1, 1900 (XP002216968).

(Continued)

*Primary Examiner* — Scott J Sugarman
*Assistant Examiner* — Vipin Patel
(74) *Attorney, Agent, or Firm* — Sughrue Mion, PLLC

(57) ABSTRACT

An on-vehicle camera lens glass material satisfies at least one of conditions in which a measurement result in water resistance based on a powder method prescribed by Japanese Optical Glass Industrial Standard is $1^{st}$ Class, a measurement result in Knoop hardness based on a measurement method prescribed by Japanese Optical Glass Industrial Standard is $6^{th}$ Class or higher, a measurement result in solarization based on a measurement method prescribed by Japanese Optical Glass Industrial Standard is 2% or less, and a measurement result in average linear expansion coefficient based on a measurement method prescribed by Japanese Optical Glass Industrial Standard is $100 \times 10^{-7\circ}$ $C.^{-1}$ or less.

19 Claims, 1 Drawing Sheet

OTHER PUBLICATIONS

Database WPI Week 200125, Thomson Scientific, London, GB; AN 2001-239545 (XP002493647).
Extended European Search Report dated Sep. 4, 2008.
Ohara, Inc, "Products and Services", http://www.ohara-inc.co.jp/en/product/optical/opticalglass/01002.html, Sep. 9, 2010, pp. 1-3, Table 1, Japan.
Schott AG, "Optical Glass", Catalog, 2009, p. 50, Version 1.8, Germany.
Communication dated Feb. 28, 2011 from the State Intellectual Property Office of P.R. China in a counterpart application No. 200810086565.0.

* cited by examiner

THICKNESS 0.8mm $60^{+5}_{-0}$ mm $\phi\,15^{+2}_{-0}$ mm

ON-VEHICLE CAMERA LENS GLASS MATERIAL AND ON-VEHICLE CAMERA LENS

CROSS-REFERENCE TO RELATED APPLICATION

This application claims priority from Japanese Patent Application No. 2007-073182, filed Mar. 19, 2008.

BACKGROUND OF THE INVENTION

1. Field of the Invention

The present invention relates to an on-vehicle camera lens glass material used for an optical device such as an imaging lens mounted in an on-vehicle camera and to the on-vehicle camera lens.

2. Description of Related Art

Conventionally, in order to eliminate driver's blind spots while driving a vehicle, there has been proposed a method of installing an on-vehicle camera on a vehicle. Specifically, by installing a camera for imaging the rear and the side of a vehicle on the vehicle itself, an image taken by the camera is displayed on a position where a driver can check the image by his/her own eyes. Therefore, it is possible to eliminate the blind spots.

In view of a low price and light weight, an optical device made of plastic material or low refractive glass material is broadly used for an optical device such as an imaging lens mounted on the on-vehicle camera, as described in Japanese Patent Unexamined Publication No. JP-A-2006-11093.

By comparison between the materials in an optical performance of lens material, the glass material is more excellent than plastic material in various properties. Accordingly, in the imaging lens constituted of a plurality of lenses, it has been studied that a plastic lens and a glass lens are used jointly in order to decrease manufacturing costs and improve optical performance.

In such an on-vehicle camera, it is required to increase resolution and an imaging view angle of the camera in order to secure safety and improve recordability. However, it is difficult to configure an imaging lens suitable for the requirement by the plastic lens and the low refractive glass lens. Hence, in the imaging lens mounted in the on-vehicle camera, the configuration using high refractive optical glass can be considered.

In such an imaging lens mounted in the on-vehicle camera, unlike an imaging lens of general camera, there is a possibility that the lens is damaged or eroded by shock, wind pressure, and dust while vehicle is running. In addition, there is also concern about lens surface deterioration and metamorphosis that is caused by acid rain and chemicals such as a cleanser and a wax used at the time of car washing. Further, when oil, dust, and coarse particulates are attached on a surface of the imaging lens, sometimes the lens surface may be blurred as time elapses, and when a contamination is in contact with the lens surface for a long time, sometimes the lens surface may metamorphose.

In addition, when the camera is mounted on the front side of a vehicle body, there is concern about lens deterioration caused by heat generated from an engine and by nitrous oxide contained in gas exhausted from other vehicles which are running ahead of the vehicle. Further, the lens is frequently exposed under a severe environment where, for example, direct sun light including ultraviolet rays is irradiated on the lens for a long time. Particularly, when the lens has a wide-view angle, a first surface of the imaging lens has a larger exposed area. Therefore, the environment effect on the lens increases.

Accordingly, when the imaging lens mounted in the on-vehicle camera is made of plastic material or optical glass material used in a general imaging lens, there is concern that enough durability is not secured. The reason is that plastic material and glass material, which has low glass transition temperature suitable for a precision press forming process that enables mass production of an aspheric surface lens, have low hardness and are easily scratched. In addition, plastic material has lower ultraviolet resistance than glass material, and is easily deteriorated when ultraviolet rays are irradiated thereon for a long time.

In this case, it can be considered that a protective member made of an excellent glass material in chemical durability is disposed at the front of the imaging lens in order to prevent the lens from being directly exposed to outside environment such as wind or rain. However, when the protective member is installed, there is concern that the imaging view angle of the lens is restricted, and it becomes difficult to sufficiently enlarge the imaging view angle.

SUMMARY OF THE INVENTION

Accordingly, the invention has been made in consideration of the situation mentioned above, and its object is to provide an on-vehicle camera lens glass material that is excellent in resistance of acid rain and chemicals, has a hardness enough to keep from scratching, is less deteriorated in characteristics by ultraviolet rays, has high refractive index, and is suitable to constitute an optical device such as an imaging lens mounted in an on-vehicle camera exposed to severe environment, and to provide an on-vehicle camera lens made of the on-vehicle camera lens glass material.

To solve the problems mentioned above and to achieve the object, an on-vehicle camera lens glass material according to the invention has any one of the following configurations.

<Configuration 1>

An on-vehicle camera lens glass material used for an on-vehicle camera lens, wherein a measurement result in acid resistance based on a powder method prescribed by Japanese Optical Glass Industrial Standard (1999 edition) is $1^{st}$ Class or $2^{nd}$ Class.

<Configuration 2>

The on-vehicle camera lens glass material according to Configuration 1, wherein the material satisfies at least one of conditions:

a measurement result in water resistance based on a powder method prescribed by Japanese Optical Glass Industrial Standard (1999 edition) is $1^{st}$ Class, a measurement result in Knoop hardness based on a measurement method prescribed by Japanese Optical Glass Industrial Standard (1975 edition) is $6^{th}$ Class or higher, a measurement result in solarization based on a measurement method prescribed by Japanese Optical Glass Industrial Standard (2005 edition) is 2% or less, and a measurement result in average linear expansion coefficient based on a measurement method prescribed by Japanese Optical Glass Industrial Standard (2003 edition) is $100 \times 10^{-7}$ °C.$^{-1}$ or less.

<Configuration 3>

The on-vehicle camera lens glass material according to Configuration 1, wherein a total content of $SiO_2$ and $ZrO_2$ is 10% by weight or more.

<Configuration 4>

The on-vehicle camera lens glass material according to any one of Configurations 1, wherein the material includes transparent crystallized glass.

In addition, the transparent crystallized glass can be obtained, for example, by a heat treatment for melting a glass material based on $SiO_2$—$Al_2O_3$—$Li_2O$ based composition containing a crystal nucleating agent.

<Configuration 5>

The on-vehicle camera lens glass material according to Configuration 1, wherein a content of $SiO_2$ is 60% by weight or more.

<Configuration 6>

The on-vehicle camera lens glass material according to Configuration 1, wherein a total content of $TiO_2$, $Nb_2O_5$, $Ta_2O_5$, and $ZrO_2$ is 20% by weight or more.

<Configuration 7>

The on-vehicle camera lens glass material according to Configurations 1, wherein the material contains:
  0.1 to 45% by weight of $SiO_2$,
  0.1 to 25% by weight of $B_2O_3$,
  0.1 to 20% by weight of $ZrO_2$,
  0 to 50% by weight of $La_2O_3$, and
  0 to 30% by weight of $Nb_2O_5$.

<Configuration 8>

The on-vehicle camera lens glass material according to Configuration 7, wherein the material further contains at least one of $Al_2O_3$, $Li_2O$, $Na_2O$, $K_2O$, $MgO$, $CaO$, $SrO$, $BaO$, $ZnO$, $TiO_2$, $La_2O_3$, $Gd_2O_3$, $Y_2O_3$, $Ta_2O_5$, $WO_3$, $Sb_2O_3$, $SnO_2$, and F.

<Configuration 9>

The on-vehicle camera lens glass material according to Configurations 1, wherein a refractive index with respect to line d is 1.70 or more.

<Configuration 10>

An on-vehicle camera lens glass material used for an on-vehicle camera lens, wherein
  a total content of $TiO_2$ and $Nb_2O_5$ is in the range of 0.1 to 0.3% by weight, and/or
  a total content of $CeO_2$ and $Fe_2O_3$ is in the range of 0.1 to 1% by weight.

In addition, the $TiO_2$ and the $Nb_2O_5$ are components selected to increase refractive index of glass, and it is possible to obtain an effect of shielding ultraviolet rays.

<Configuration 11>

The on-vehicle camera lens glass material according to Configuration 10, wherein a refractive index with respect to line d is 1.70 or more.

In addition, an on-vehicle camera lens according to the invention has the following configuration.

<Configuration 12 and 13>

An on-vehicle camera lens, wherein at least a first lens close to an object point is made of the on-vehicle camera lens glass material according to Configuration 1 or 10.

<Configuration 14 and 15>

The on-vehicle camera lens according to Configuration 12 or 13, wherein a photocatalytic film is formed on at least a first surface, which is close to the object point, of the first lens.

<Configuration 16 and 17>

The on-vehicle camera lens according to Configuration 12 or 13, wherein a hard coat film is formed on at least a first surface, which is close to the object point, of the first lens.

<Configuration 18 and 19>

The on-vehicle camera lens according to Configuration 12 or 13, wherein a hard coat film and a photocatalytic film are formed on at least a first surface, which is close to the object point, of the first lens.

<Configuration 20 and 21>

The on-vehicle camera lens according to any one of Configurations 12 or 13, wherein at least one surface of the lens is formed as an aspheric surface.

The on-vehicle camera lens glass material described in Configuration 1 of the invention is used for an on-vehicle camera lens. In the material, a measurement result in acid resistance based on a powder method prescribed by Japanese Optical Glass Industrial Standard is $1^{st}$ Class or $2^{nd}$ Class. Therefore, by using the on-vehicle camera lens glass material, it is possible to form an on-vehicle camera lens excellent in chemical durability (acid resistance).

The on-vehicle camera lens glass material described in Configuration 2 of the invention is used for an on-vehicle camera lens. The material satisfies at least one of conditions in which a measurement result in water resistance based on a powder method prescribed by Japanese Optical Glass Industrial Standard is $1^{st}$ Class, a measurement result in Knoop hardness based on a measurement method prescribed by Japanese Optical Glass Industrial Standard is $6^{th}$ Class or higher, a measurement result in solarization based on a measurement method prescribed by Japanese Optical Glass Industrial Standard is 2% or less, and a measurement result in average linear expansion coefficient based on a measurement method prescribed by Japanese Optical Glass Industrial Standard is $100 \times 10^{-7}$ °$C.^{-1}$ or less.

Therefore, by using the on-vehicle camera lens glass material, it is possible to form an on-vehicle camera lens excellent in chemical durability (acid resistance), scratch resistance, ultraviolet resistance, or thermal characteristics.

In the on-vehicle camera lens glass material described in Configuration 3 of the invention, a total content of $SiO_2$ and $ZrO_2$ is 10% by weight or more. Therefore, it is possible to form an on-vehicle camera lens excellent in chemical durability (acid resistance).

The on-vehicle camera lens glass material described in Configuration 4 of the invention includes transparent crystallized glass. Therefore, the on-vehicle camera lens glass material has good optical characteristics and by using the material it is possible to form an on-vehicle camera lens excellent in chemical durability (acid resistance).

In the on-vehicle camera lens glass material described in Configuration 5 of the invention, a content of $SiO_2$ is 60% by weight or more. Therefore, it is possible to form an on-vehicle camera lens excellent in chemical durability (acid resistance).

In addition, as a glass excellent in chemical durability, 'Pyrex' (registered trademark) has been known. The 'Pyrex' (registered trademark) includes $SiO_2$ of 70 to 80% by weight as a glass component, and shows excellent chemical durability. However, the 'Pyrex' (registered trademark) is not a glass produced to from an optical device, and so optical homogeneity thereof is not sufficiently high. Meanwhile, the on-vehicle camera lens glass material according to the invention has high optical homogeneity and excellent chemical durability.

In the on-vehicle camera lens glass material described in Configuration 6 of the invention, a total content of $TiO_2$, $Nb_2O_5$, $Ta_2O_5$, and $ZrO_2$ is 20% by weight or more. Therefore, it is possible to form an on-vehicle camera lens that is excellent in chemical durability (acid resistance) and has a high refractive index.

In the on-vehicle camera lens glass material described in Configuration 10 of the invention, a total content of $TiO_2$ and $Nb_2O_5$ is in the range of 0.1 to 0.3% by weight, and/or a total content of $CeO_2$ and $Fe_2O_3$ is in the range of 0.1 to 1% by weight. Therefore, it is possible to form an on-vehicle camera lens that has a high refractive index and has an effect of shielding ultraviolet rays.

In addition, when a first lens (the most subject side lens) of the on-vehicle camera lens employs the on-vehicle camera lens glass material, ultraviolet rays are shielded or attenuated by the first lens even though the second and following lenses employs plastic lenses. Therefore, there is no deterioration caused by ultraviolet rays in the second and following lenses.

In the on-vehicle camera lens glass material described in Configuration 11 of the invention, a refractive index with respect to line d is 1.70 or more. Therefore, it is possible to from an on-vehicle camera lens that has a short length as a whole or has a wide view angle.

In the on-vehicle camera lens described in Configuration 12 or 13 of the invention, at least a first lens close to an object point is made of the on-vehicle camera lens glass material according to Configuration 1 or 10. Therefore, the on-vehicle camera lens is excellent in chemical durability (acid resistance), scratch resistance, ultraviolet resistance, or thermal characteristics.

In the on-vehicle camera lens described in Configuration 14 or 15 of the invention, a photocatalytic film is formed on at least a first surface, which is close to the object point, of the first lens. Therefore, the on-vehicle camera lens is excellent in environmental resistance, and thus can be applied to a camera having a wide view angle.

In the on-vehicle camera lens described in Configuration 16 or 17 of the invention, a hard coat film is formed on at least a first surface, which is close to the object point, of the first lens. Therefore, the on-vehicle camera lens is excellent in scratch resistance.

In the on-vehicle camera lens described in Configuration 18 or 19 of the invention, a hard coat film and a photocatalytic film are formed on at least a first surface, which is close to the object point, of the first lens. Therefore, the on-vehicle camera lens is excellent in environmental resistance, and thus can be applied to a camera having a wide view angle. In addition, the lens is also excellent in scratch resistance.

In the on-vehicle camera lens described in Configuration 20 or 21 of the invention, at least one surface of the lens is formed as an aspheric surface. Therefore, the on-vehicle camera lens has good image-formation characteristics under small aberration.

Consequently, according to the invention, it is possible to provide an on-vehicle camera lens glass material that is excellent in resistance of acid rain and chemicals, has a hardness enough to keep from scratching, is less deteriorated in characteristics by ultraviolet rays, has high refractive index, and is suitable to constitute an optical device such as an imaging lens mounted in an on-vehicle camera exposed to severe environment. In addition, it is also possible to provide an on-vehicle camera lens made of the on-vehicle camera lens glass material.

DETAILED DESCRIPTION OF THE PREFERRED EMBODIMENTS

Hereinafter, a preferred embodiment of an on-vehicle camera lens glass material according to the invention will be described with reference to the drawings.

Figure 1:
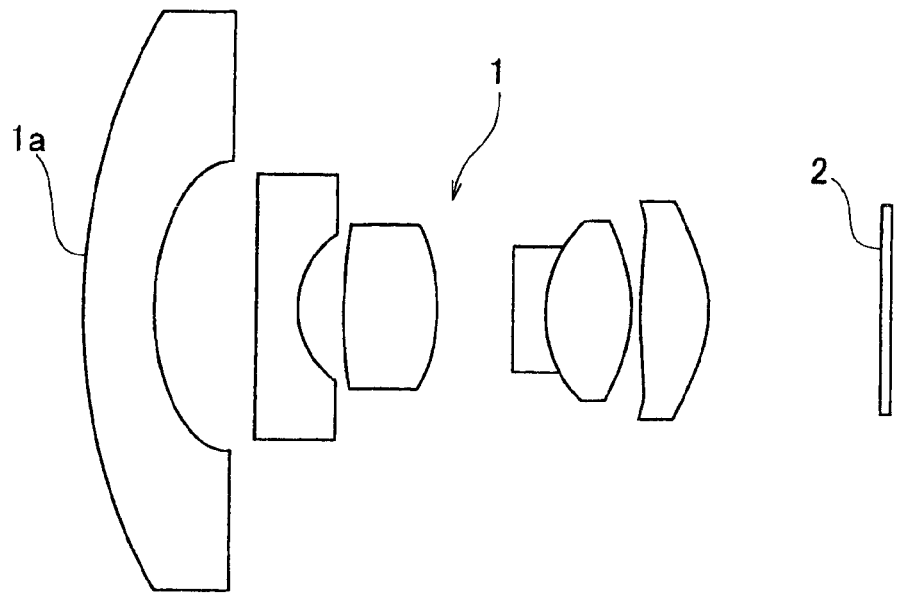
FIG. 1 is a sectional view illustrating a structure of an on-vehicle camera.

FIG. 1 is a sectional view illustrating a structure of an on-vehicle camera.

The on-vehicle camera lens glass material according to the invention is a glass for forming the on-vehicle camera lens. The on-vehicle camera is a camera that is mounted on an outer side of a vehicle itself, and includes an on-vehicle camera lens (an imaging lens) 1 and an imaging element (CCD) 2 for taking an image formed by the on-vehicle camera lens 1 as shown in FIG. 1. In addition, the on-vehicle camera is disposed on the rear of the vehicle and is used for checking the rear, or is disposed on the front of the vehicle and is used for checking the front, the side, or a distance from a car ahead.

The on-vehicle camera lens 1 is formed of plural sheets of lenses, light exiting from a subject is incident through a first lens 1a close to an object point (the subject). The light sequentially passes the second and following lenses, and is formed as an image of the subject on an imaging surface.

An on-vehicle camera lens glass material forming the on-vehicle camera lens is frequently exposed to rain, particularly, acid rain, and thus chemical durability (acid resistance) is required for at least the first lens 1a. The acid rain is caused by a plurality of contaminations existing in the atmosphere. The on-vehicle camera lens glass material according to the invention has a sufficient chemical durability. Chemical durability of the on-vehicle camera lens glass material can be evaluated by a diluted nitric acid, and influence caused by acid rain also can be evaluated.

Specifically, in the on-vehicle camera lens glass material according to the invention, a measurement result in acid resistance based on a powder method prescribed by Japanese Optical Glass Industrial Standard (1999 edition) is $1^{st}$ Class or $2^{nd}$ Class. The reason is that, in the chemical durability (the powder method) of an optical glass based on the standard, when the acid resistance is $3^{rd}$ Class or more, the glass is blurred by erosion of acid rain, and a clear image can not be taken. In addition, the acid resistance is preferably $1^{st}$ Class and a weight reduction ratio is preferably less than 0.1%.

Japanese Optical Glass Industrial Standard (JOGIS) is a standard for a method of measuring an optical glass characteristics prescribed by Japanese Optical Glass Industrial Association. The measurement of the chemical durability (the acid resistance) based on the powder method prescribed by Japanese Optical Glass Industrial Standard (1999 edition) proceeds in the following order. First, samples are adjusted as follows.

(1) A glass having new fracture surface is powdered in a mortar, the powder filtered through a sub wire sieve of 710 μm is filtered again through a standard wire sieve of 600 μm, and then the powder remaining in 425 μm is extracted. In addition, as the sieves, standard sieves specified by JIS Z 8801 (standard) are used.

(2) An amount of the powder three times as much as specific gravity gram of glass is put in a 50 ml beaker, and 15 ml of a 99.5 vol % methanol is added. Then fine glass particulates are removed by means of decantation method.

(3) After this cleaning process is repeated five times, the sample is dried in an air bath of 120 to 130° C. for 60 minutes, and is stored in a silica gel desiccator.

Next, measurement of acid resistance proceeds in the following order.

Figure 2:
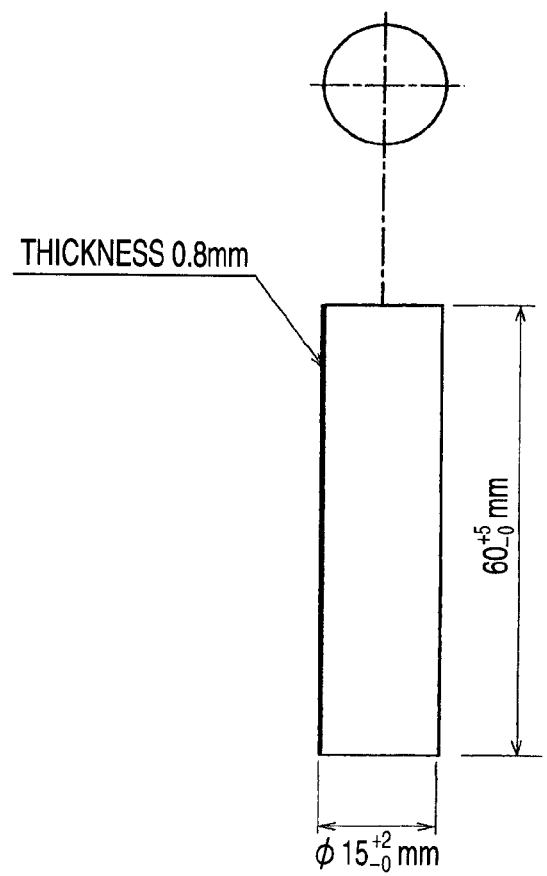
FIG. 2 is a side view and a top plan view illustrating a configuration of a dissolution basket used in acid resistance measurement based on a powder method prescribed by Japanese Optical Glass Industrial Standard.

(1) a sample as much as specific gravity gram of glass is extracted by a dissolution basket, is shaken slightly, is put in a capped weighing bottle, and then the sample is precisely weighed. The dissolution basket includes a standard sieve of 177 to 210 μm that is made of platinum and a structure and a size thereof is shown in FIG. 2.

(2) 80 ml of a 10 m mol/l {0.01N} nitric acid aqueous solution is put in a cleaned and dried round bottom flask, cooling pipes are fixed on the flask, and the flask is kept in a heating device for 10 minutes. As the nitric acid, a special grade nitric acid specified by JIS K 8541 (nitric acid (reagent)) is used. As the heating device, a boiling water bath having a depth capable of completely containing a rounded part of the round bottom flask is used. Water temperature of the water bath must be kept at 99° C. or more at a horizontal position higher by 20±10 mm than the bottom of the round bottom flask.

(3) The dissolution basket in which the sample is put is carefully inserted in the round bottom flask, is processed in the heating device for 60 minutes, and then the basket is taken out.

(4) About 80 ml of the 99.5 vol % methanol is put in a 100 ml beaker, and the basket is dipped therein to be cleaned.

(5) After the step (4) is repeated three times, the sample is put in the weighing bottle, and is dried in the air bath of 120 to 130° C. for 60 minutes.

(6) The weighing bottle is moved to the silica gel desiccator, is precisely weighed in a state where the bottle is capped after standing to cool for 60 minutes.

(7) The step (6) is repeated two times.

(8) A weight reduction ratio (% by weight) is calculated from a weight of the sample and a reduced weight thereof, and an average value of the weight reduction ratios calculated two times is obtained.

Then, class of the acid resistance is determined by the weight reduction ratio (% by weight). This acid resistance is classified into six grades as $1^{st}$ Class when the weight reduction ratio is less than 0.20 (% by weight), $2^{nd}$ Class when the ratio is 0.20 or more and less than 0.35, $3^{rd}$ Class when the ratio is 0.35 or more and less than 0.65, $4^{th}$ Class when the ratio is 0.65 or more and less than 1.20, $5^{th}$ Class when the ratio is 1.20 or more and less than 2.20, and $6^{th}$ Class when the ratio is 2.20 or more.

In addition, in an aspect of the on-vehicle camera lens glass material according to the invention, it is preferred that a glass have at least one of the following characteristics.

Specifically, to endure not only acid rain but also rain or car washing using tap water, water resistance is preferably $1^{st}$ Class, based on the measurement method (the powder method) for chemical durability of an optical glass prescribed by Japanese Optical Glass Industrial Standard (1999 edition). It is more preferred that weight reduction ratio is less than 0.02%.

In addition, since an on-vehicle camera is covered with sand dust while a vehicle is running or parking outside, Knoop hardness is preferably $6^{th}$ Class or higher and more preferably $7^{th}$ Class, based on a measurement method for Knoop hardness of an optical glass prescribed by Japanese Optical Glass Industrial Standard (1975 edition).

In addition, since an on-vehicle camera is exposed to ultraviolet rays, a measured value of solarization is preferably 2% or less, and more preferably 1% or less, based on a measurement method for solarization of an optical glass prescribed by Japanese Optical Glass Industrial Standard (2005 edition).

In addition, sometimes an on-vehicle camera used to be heated up to 60° C. or more when receiving direct sun light, and used to be rapidly cooled down by rain or car washing water. Accordingly, to decrease thermal shock, it is preferred that thermal expansion coefficient be small. When an average linear expansion coefficient prescribed by Japanese Optical Glass Industrial Standard (2003 edition) exceeds $100 \times 10^{-7}$ °C.$^{-1}$, a crack may be caused by the thermal shock, and the refractive index performance may be temporally affected by stress. Accordingly, the average linear expansion coefficient is preferably $10 \times 10^{-7}$ °C.$^{-1}$ or less, and more preferably $90 \times 10^{-7}$ °C.$^{-1}$ or less.

It is preferred to satisfy at least one of characteristics relating to water resistance, Knoop hardness, solarization characteristic, and average linear expansion coefficient, and it is more preferred to satisfy these characteristics simultaneously.

The measurement of water resistance based on the powder method prescribed by Japanese Optical Glass Industrial Standard (1999 edition) is performed in the same manner as the measurement of acid resistance except that '10 mmol/l {0.01N} nitric acid aqueous solution' described in the step (2) according to acid resistance measurement based on the powder method mentioned above is replaced with pure water.

This water resistance is classified into six grades as:

$1^{st}$ Class when the weight reduction ratio is less than 0.05 (% by weight), $2^{nd}$ Class when the ratio is 0.05 or more and less than 0.10, $3^{rd}$ Class when the ratio is 0.10 or more and less than 0.25, $4^{th}$ Class when the ratio is 0.25 or more and less than 0.60, $5^{th}$ Class when the ratio is 0.60 or more and less than 1.10, and $6^{th}$ Class when the ratio is 1.10 or more.

The Knoop hardness prescribed by Japanese Optical Glass Industrial Standard (1975 edition) is a quotient obtained from dividing a load at the time when a quadrangular pyramidal pit is formed on a measurement surface by using Knoop indenter (a quadrangular pyramidal diamond indenter of which face angles are 172°30' and 130°) by a projected area obtained from a diagonal length of the longer side of the eternal pit. The Knoop hardness Hk is give by the following expression.

$$Hk = F / \{9.807 \cdot (\tfrac{1}{2}) \cot(\tfrac{1}{2})(172°30') \cdot \tan(\tfrac{1}{2})(130°) \cdot l^2\} = F/(0.68923 \cdot l^2) = 1.451 \cdot F/l^2$$

where F is a load (N) and l is a diagonal length (mm) of the longer side.

In addition, when a unit of the load F is kgf, the Knoop hardness Hk is give by the following expression.

$$Hk = 14.23 \cdot F/l^2.$$

In the measurement, a tester appropriate or pursuant to JIS B 7734 (a micro hardness tester) is used as a tester, and the Knoop indenter mentioned above is used as an indenter. A polished surface or a surface pursuant thereto is used as the measurement surface of the sample, and a thickness of the sample is required to be 1.5 times or more of the diagonal length of the longer side of the pit.

Measurement thereof proceeds in the following order.

(1) Magnitude of load is set by 0.98N {0.1 kgf} as a standard.

(2) The test surface of the sample is set perpendicular to the indenter installation axis.

(3) Time for keeping the added load at the predetermined magnitude is set by 15 seconds as a standard.

(4) The diagonal length of the longer side of the pit is measured after the added load is completely removed.

In addition, it is preferred that the measurement should be performed in the microscopic field range of 20 to 70%.

(5) The measurement is repeated at least five times, and an average of the measurement results is obtained.

This Knoop hardness is classified into seven grades as:
1st Class when less than 150,
2nd Class when 150 or more and less than 250,
3rd Class when 250 or more and less than 350,
4th Class when 350 or more and less than 450,
5th Class when 450 or more and less than 550,
6th Class when 550 or more and less than 650, and
7th Class when 650 or more.

In addition, measurement of solarization prescribed by Japanese Optical Glass Industrial Standard (2005 edition) is for measuring variation in spectral transmittance of an optical glass that is caused by generally sun rays or ultraviolet irradiation. In the measurement, an ultraviolet irradiation device is used. The ultraviolet irradiation device is configured so that a tool for supporting the sample is rotated around a light source (an ultra high pressure mercury lamp) two times per minute, and includes a cooling fan. As a spectral transmittance measurement device, a device pursuant to JIS Z 8722 (a measurement method for colors/reflection and transmission object colors) is used.

A size of the sample is set by 30 mm×13 mm×10 mm, and both surfaces of 30 mm×13 mm are polished. In addition, it is preferred that the sample ahead of measurement avoid irradiation of ultraviolet rays and radioactive rays.

Measurement thereof proceeds in the following order.

(1) The spectral transmittance of the sample ahead of irradiation is measured pursuant to JIS Z 8722.

(2) The sample is stably inserted in the sample supporting tool of the measurement device.

(3) A light source is turned on, and an input of the light source is adjusted so that light amount thereof reaches a predetermined value.

(4) While the sample is rotated, ultraviolet rays are irradiated for four hours.

(5) Airflow of the cooling fan is adjusted so that temperature of the sample in the course of irradiating ultraviolet rays reaches 100±5° C.

In addition, the airflow of the cooling fan is adjusted so that a temperature-indicating material added on a surface, which is exposed to ultraviolet rays, of a dummy sample placed on a position of the sample indicates 100±5° C. It is known that degree of solarization greatly depends on the temperature of the sample, and thus the temperature adjustment of the sample is significant.

(6) The sample irradiated by ultraviolet rays is stored in a dark place and spectral transmittance thereof is measured within 24 hours.

In addition, in the spectral transmittance, reflection loss is included.

In addition, in a wavelength corresponding to 80% of spectral transmittance ahead of ultraviolet irradiation, the degree of solarization is represented by percentage, which is calculated to the first decimal place, of spectral transmittance reduction after ultraviolet irradiation.

In addition, the measurement of average linear expansion coefficient prescribed by Japanese Optical Glass Industrial Standard (2003 edition) is for measuring an average linear expansion coefficient of an optical glass in the vicinity of room temperature. Here, the vicinity of room temperature is defined as the vicinity of the temperature range of −30° C. to +70° C. centered on a standard temperature 20° C.

As measurement devices, a sample supporting tool made of silica glass, a transmission rod, and a differential thermal dilatometer capable of measuring variation in at least 1 μm length are used. In the measurement, there is used a furnace having a structure where the furnace can be cooled down up to −60° C. or less by passing a coolant therethrough, can be heated up to about +100° C., and can keep in-furnace temperature distribution of a part thereof allowing the entire sample to be heated within ±1° C. As the coolant, liquid nitrogen, carbon dioxide gas, or dry ice is generally used, but which one is used depends on a structure and capacity of the furnace.

The sample, which is formed as a round rod having a length of 20 mm and a diameter of 4±0.5 mm and of which deformation is not recognized by a deformation tester, is used.

Measurement thereof proceeds in the following order.

(1) The length of the sample at room temperature is measured by a caliper or a micrometer.

(2) The sample is stably installed between the transmission rod and the sample supporting tool made of silica glass without gaps, and force in the range of 98 mN {10 gf} to 196 mN {20 gf} is applied to a section of the sample.

(3) A thermocouple for measuring temperature is installed close to the center of the sample.

(4) The furnace is cooled down up to −60° C. or less by passing a coolant therethrough.

(5) A rate of temperature increase of the sample is set by 2° C. per minute, and temperature and expansion of the sample is measured.

In addition, the average linear expansion coefficient is calculated by the following expression.

$$\alpha_{-30\sim+70°C.} = \{d\lambda/(\lambda \times dT)\} + Q$$

where $\alpha_{-30\sim70°C.}$ is the average linear expansion coefficient (° C.$^{-1}$), $\lambda$ is a length (mm) of the sample at room temperature, dT is temperature difference (° C.) in the range of −30° C. to +70° C., d$\lambda$ is length variation (mm) of the sample corresponding to the temperature difference dT, Q is an average linear expansion coefficient of silica glass in the temperature range of −30° C. to +70° C. The average linear expansion coefficient of silica glass is generally 5×10$^{-7}$° C.$^{-1}$. The obtained average linear expansion coefficient is represented as an integer up to a first decimal place by a unit of 10$^{-7}$° C.$^{-1}$.

In addition, by using the same sample mentioned above, an average linear expansion coefficient of an optical glass in a case where temperature of the glass is transition temperature Tg or more is obtained as follows.

(1) The length of the sample at room temperature is measured by a caliper or a micrometer.

(2) The sample is stably installed between the transmission rod and the sample supporting tool made of silica glass without gaps, and force in the range of 98 mN {10 gf} to 196 mN {20 gf} is applied to a section of the sample.

(3) A thermocouple for measuring temperature is installed close to the center of the sample.

(4) A rate of temperature increase of the sample is set by 4° C. per minute, and temperature and expansion of the sample is measured.

In addition, the average linear expansion coefficient is calculated by the following expression.

$$\alpha_{100\sim300°C.} = \{d\lambda/(\lambda \times dT)\} + Q$$

where $\alpha_{100\sim300°C.}$ is the average linear expansion coefficient (° C.$^{-1}$), $\lambda$ is a length (mm) of the sample at room temperature, dT is temperature difference (° C.) in the range of 100° C. to 300° C., d$\lambda$ is length variation (mm) of the sample corresponding to the temperature difference dT, Q is an average linear expansion coefficient of silica glass in the temperature range of 100° C. to 300° C. Here, the average linear expansion coefficient of silica glass is generally 6×10$^{-7}$° C.$^{-1}$. The obtained average linear expansion coefficient is represented as an integer up to a first decimal place by a unit of 10$^{-7}$° C.$^{-1}$.

Next, a composition example of the optical glass according to the invention will be described.

In the on-vehicle camera lens glass material according to the invention, as described above, it is preferred that a total content of $SiO_2$ and $ZrO_2$ be 10% by weight or more in order to realize acid resistance, water resistance, high hardness, ultraviolet resistance, and high refractive index. The total content of $SiO_2$ and $ZrO_2$ is more preferably 15% by weight or more, and further preferably 20% by weight or more. The $SiO_2$ is a base component of glass, and is a main component that determines the chemical durability. The $ZrO_2$ is a component that increases the refractive index and simultaneously improves the chemical durability. The total content of $SiO_2$+$ZrO_2$ is set in the range mentioned above, and thus it is possible to improve chemical durability and obtain high refractive index.

In addition, to improve the chemical durability of glass, the $SiO_2$ is preferably set by 0.1% by weight or more, and to easily obtain a glass having high refractive index, the $SiO_2$ is preferably set by 45% by weight or less. Thus, the content of $SiO_2$ is more preferably set by 1 to 30% by weight. In addition, to improve the chemical durability, the content of $SiO_2$ may be set by 60% by weight or more.

In addition, the on-vehicle camera lens glass material according to the invention may include a transparent crystallized glass. The transparent crystallized glass is obtained, for example, by a heat treatment for melting a glass material based on $SiO_2$—$Al_2O_3$—$Li_2O$ based composition containing a crystal nucleating agent. In addition, as the transparent crystallized glass, there has been known a low expansion transparent crystallized glass based on $Li_2O$—$Al_2O_3$—$SiO_2$ based. In the crystallized glasses, a transparent glass can be formed in accordance with a composition or a heat treatment condition, most of them is configured to have as a main crystal a β-quartz solid solution crystal containing $TiO_2$ of about 1.5% to 5% as a crystallizing agent.

In addition, the $B_2O_3$ is also a base component of glass and simultaneously is an effective component that improves meltability. When the $B_2O_3$ is less than 0.1% by weight, the effect thereof is not sufficient. Conversely, when the $B_2O_3$ is more than 25% by weight, the chemical durability of glass is intended to deteriorate. Accordingly, the content of the $B_2O_3$ is preferably in the range of 0.1 to 25% by weight, and more preferably in the range of 0.1 to 20% by weight.

The $ZrO_2$ is a component that increases a refractive index and improves chemical durability. When the $ZrO_2$ is less than 0.1% by weight, the effect there of is low. Conversely, when $ZrO_2$ is more than 20% by weight, it is difficult to vitrify. Accordingly, the content of the $ZrO_2$ is preferably in the range of 0.1 to 20% by weight, and more preferably in the range of 1 to 15% by weight.

The $La_2O_3$ is a component that realizes a high refractive index and makes easy to take an image with small aberration. When the $La_2O_3$ is less than 0.1% by weight, the effect thereof does not act. Conversely, when the $La_2O_3$ is more than 50% by weight, the glass is intended to be easily devitrified. Accordingly, the content of the $La_2O_3$ is preferably in the range of 0.1 to 50% by weight, more preferably in the range of 0.1 to 40% by weight, and further preferably in the range of 0.1 to 30% by weight.

The $Nb_2O_5$ is a component that realizes a high refractive index and is excellent in chemical durability. When the $Nb_2O_5$ is less than 0.1% by weight, the effect thereof does not act. Conversely, when the $Nb_2O_5$ is more than 30% by weight, the glass is intended to be easily devitrified. Accordingly, the content of the $Nb_2O_5$ is preferably in the range of 0.1 to 30% by weight, more preferably in the range of 1 to 30% by weight, and further preferably in the range of 10 to 30% by weight.

As a result, as described above, it is preferred that the glass material contains:

$SiO_2$ of 0.1 to 45% by weight;
$B_2O_3$ of 0.1 to 25% by weight;
$ZrO_2$ of 0.1 to 20% by weight;
$La_2O_3$ of 0 to 50% by weight; and
$Nb_2O_5$ of 0 to 30% by weight.

In addition, it is preferred that the on-vehicle camera lens glass material further contain at least one of $Al_2O_3$, $Li_2O$, $Na_2O$, $K_2O$, $MgO$, $CaO$, $SrO$, $BaO$, $ZnO$, $TiO_2$, $La_2O_3$, $Gd_2O_3$, $Y_2O_3$, $Ta_2O_5$, $WO_3$, $Sb_2O_3$, $SnO_2$, and F. These are not essential components, but may be added to the material on purpose to adjust a refractive index characteristic, improve meltability, adjust a heat expansion characteristic, perform clarification, and improve chemical durability.

In addition, the $Nb_2O_5$ and $TiO_2$ are components that increase ultraviolet shielding effect and chemical durability, simultaneously. Thus, it is preferred that a total content of $TiO_2$, $Nb_2O_5$, $Ta_2O_5$ and $ZrO_2$ be 20% by weight or more. Alternatively, it is preferred that a total content of $TiO_2$ and $Nb_2O_5$ is in the range of 0.1 to 0.3% by weight, and/or a total content of $CeO_2$ and $Fe_2O_3$ is in the range of 0.1 to 1% by weight.

In addition, the on-vehicle camera needs wide eyesight, and thus it is preferred that the on-vehicle camera lens glass material according to the invention have high refractive index. When a refractive index (nd) of the material with respect to line d is less than 1.70, it is difficult to configure a lens having small size and wide view angle. Accordingly, in the on-vehicle camera lens glass material, a refractive index with respect to line d is preferably 1.70 or more, more preferably 1.75 or more, and further preferably 1.80 or more.

Abbe number (vd) is freely selectable, but the vd is preferably in the range of 15 to 60, more preferably in the range of 20 to 50, and further preferably in the range of 25 to 45.

The on-vehicle camera lens glass material according to the invention can be manufactured by a general optical glass manufacturing process.

For example, the on-vehicle camera lens glass material is manufactured by processes of:

forming a mixed raw material by precisely weighing and mixing the glass raw materials, which properly employs an oxide, a hydroxide, a carbonate, a nitrate, a chloride, a sulfide, and the like, to obtain a desired composition;

vitrifying the mixed raw material by heating;

heating the molten glass in a heat-resistant container of which a content of platinum is 95% by weight or more;

homogenizing the molten glass by stirring it with a rod having vanes, the rod having a content of platinum on the surface thereof is 95% by weight or more;

clarifying the molten glass by defoaming it.

The molten glass homogenized by the method mentioned above is formed by poring it to a mold to be molded, and then is cooled down up to room temperature in a furnace heated up to near the annealing point of glass.

A glass piece is cut from block shaped glasses obtained by the method mentioned above, and the glass piece is grinded and polished. Therefore, it is possible to manufacture optical devices such as a lens and a prism. Alternatively, a glass piece is cut from the block shaped glasses, and is processed into a press molding material. Then, the material is heated to be soften, and is press-molded in a shape similar to an optical device by using a press molding tool. Subsequently, the press-molded product is grinded and polished, and thus it is possible to manufacture an optical device such as a lens or a prism.

In any methods mentioned above, the glass polishing process is inserted. In this connection, the on-vehicle camera lens glass material according to the invention has high Knoop hardness. Thus, the material is easy to be finished with a smooth lens surface and with high accuracy in shape. In addition, since an average linear expansion coefficient thereof is low, it is easy to prevent glass from being damaged in the grinding or the polishing process. In addition, the on-vehicle camera lens glass material has excellent acid resistance and water resistance. Therefore, it may be possible to prevent so-called "blue tarnish" and "white tarnish" phenomenon caused after polishing and cleaning process. As described above, the on-vehicle camera lens glass material according to the invention has many advantageous characteristics in using and manufacturing an optical device.

The on-vehicle camera lens glass material according to the invention has the advantageous characteristics mentioned above, and thus is appropriate for a material forming the on-vehicle camera lens. When the on-vehicle camera lens is formed of a plurality of lenses, it is preferred that a first lens $1a$ close to a subject (an object point) be made of the on-vehicle camera lens glass material according to the invention.

Specifically, in the on-vehicle camera lens according to the invention, at least a first lens $1a$ close to a subject (an object point) is made of the on-vehicle camera lens glass material according to the invention mentioned above. In the on-vehicle camera lens, the second lens and following lenses are protected by the first lens $1a$ from wind and rain (acid rain), ultraviolet rays, damage caused from sand dust, and contact of various chemicals.

In addition, in the on-vehicle camera lens, it is preferred that a photocatalytic film be formed on at least a first surface, which is close to the object point, of the first lens $1a$.

The photocatalytic film is a surface layer that is formed of photocatalytic particulates only or photocatalytic particulates and the like on the lens surface. Since the film has a hydrophilizing (a super hydrophilizing) function, water drops adhering to the surface are instantly spread on the whole surface, and thus has an effect of preventing the surface pollution caused by dust.

As the photocatalytic particulates, it is preferred to use a crystalline titanium oxide such as an anatase type or a rutile type. Optionally, a metallic oxide such as ZnO, $SnO_2$, $SrTiO_3$, $WO_3$, $Bi_2O_3$, or $Fe_2O_3$ may be used as the photocatalytic particulates. In addition, the surface layer may include silica or silicon other than the photocatalytic particulates.

Exemplary methods of forming a hydrophilic surface layer containing photocatalytic particulates, in a case of a titanium oxide (titania), include methods of:
 forming an amorphous titania,
 coating a silica-blended titania,
 coating a tin oxide-blended titania, and
 coating a titania-contained silicone coating material.

In the method of forming the amorphous titania, firstly a target surface is coated with the amorphous titania, and the amorphous titania is phase-changed into a crystalline titania by a baking process, and it is possible to employ any one of the following methods.

(1) Hydrolysis and Dehydration Condensation Polymerization of Organic Titanium Compound A hydrolysis depressant such as hydrochloric acid or ethylamine is added to an alkoxide of titanium such as a tetraethoxy titanium, a tetraisopropoxy titanium, a tetra n-propoxy titanium, a tetrabutoxy titanium, and a tetramethoxy titanium. Then, the sample is diluted with an alcohol such as an ethanol or a propanol, and hydrolysis is partially or completely performed thereon. Then, the mixture is coated, and is dehydrated at 200° C. from room temperature. Due to the dehydration, the hydrolysis of alkoxide of titanium is completed. Thus, a titanium hydroxide is produced, and an amorphous titania layer is formed by dehydration condensation polymerization of the titanium hydroxide. The alkoxide of titanium may be replaced with other organic titanium compound such as a chelate of titanium or an acetate of titanium.

(2) Formation of Amorphous Titania by using Inorganic Titanium Compound

An inorganic titanium compound such as an acid aqueous solution of a $TiC_{14}$ or a $Ti(SO_4)_2$ is coated and is dehydrated at temperature in the range of 100 to 200° C., thereby performing hydrolysis and dehydration condensation polymerization and forming an amorphous titania layer. Alternatively, the amorphous titania layer may be formed on a surface to be coated, by chemical vapor deposition of the $TiC_{14}$.

(3) The amorphous titania layer is formed on the surface to be coated, by irradiating electron beams on a titanium target in oxidative atmosphere. The titanium target is formed as an amorphous titania by a sputtering process.

Coating a silica-blended titania is that a layer made of a mixture of titania and silica is formed on the surface to be coated. A ratio of the silica to the total amount of titania and silica is in the range of 5 mol % to 90 mol %, preferably in the range of 10 mol % to 70 mol %, and more preferably in the range of 10 mol % to 50 mol %.

In addition, as a method of forming a surface layer made of the silica-blended titania, it is possible to employ following methods.

(1) A suspension liquid including silica particulates and titania particulates of the anatase type or the rutile type is coated on the surface of the substrate (the subject to be coated), and the coated substrate is baked at a temperature of softening point or less of the substrate.

(2) A mixture of an amorphous silica precursor (for example, a tetraalkoxysilane such as a tetraethoxy titanium, a tetraisopropoxy titanium, a tetra n-propoxy titanium, a tetrabutoxy titanium, or a tetramethoxy titanium) and a crystalline titania sol is coated on the surface of the substrate. Then, a silanol is formed by performing the hydrolysis thereon as occasion demands, and the dehydration condensation polymerization is performed on the silanol by heating at about 100° C. or more. Thus, the surface layer (photocatalytic coating) in which the titania is conjugated to the amorphous silica is obtained. Particularly, when the dehydration condensation polymerization of the silanol is performed at 200° C. or more, it is possible to increase polymerization degree of the silanol and improve an alkali resistance property of the photocatalytic coating.

(3) A suspension liquid formed by diffusing the silica particulates in a solution of an amorphous titania precursor (an organic titanium compound such as an alkoxide, a chelate, or an acetate of titanium, or an inorganic titanium compound such as a $TiC_{14}$ or a $Ti(SO_4)_2$) is coated on the surface of the substrate. Then the hydrolysis and the dehydration condensation polymerization are performed on the titanium compound at a temperature of 200° C. from room temperature. Therefore an amorphous titania thin film in which the silica particulates are diffused is formed. Subsequently, the amorphous titania is heated in the range of titania crystallization temperature or more and the substrate softening point or less, and thus is phase-changed into the crystalline titania.

(4) The amorphous silica precursor (for example, a tetraalkoxysilane such as a tetraethoxy titanium, a tetraisopropoxy titanium, a tetra n-propoxy titanium, a tetrabutoxy titanium, or a tetramethoxy titanium; a silanol which is a hydrolysate of those; or a polysiloxane of which average molecular weight is 3000 or less) is mixed with a solution of the amorphous titania precursor (an organic titanium compound such as an alkoxide, a chelate, or an acetate of titanium, or an inorganic titanium compound such as a $TiC_{14}$ or a $Ti(SO_4)_2$), and the mixture is coated on the surface of the substrate. Then, by performing the hydrolysis and the dehydration condensation polymerization on these precursors, a thin film made of the mixture of the amorphous titania and amorphous silica. Subsequently, the amorphous titania is heated in the range of titania crystallization temperature or more and the substrate softening point or less, and thus is phase-changed into the crystalline titania.

Coating a tin oxide-blended titania is that a layer made of a mixture of titania and tin oxide is formed on the surface to be coated. A ratio of the tin oxide to the total amount of titania and tin oxide is in the range of 1 mol % to 95 mol %, and preferably in the range of 1 mol % to 50 mol %.

In addition, as a method of forming a surface layer made of the tin oxide-blended titania, it is possible to employ following methods.

(1) Anatase Type or Rutile Type Titania Particulates and Oxidation

A suspension liquid including tin particulates is coated on the surface of the substrate (the subject to be coated), and the coated substrate is baked at a temperature of softening point or less of the substrate.

(2) A suspension liquid formed by diffusing the tin oxide particulates in a solution of an amorphous titania precursor (an organic titanium compound such as an alkoxide, a chelate, or an acetate of titanium, or an inorganic titanium compound such as a $TiC_{14}$ or a $Ti(SO_4)_2$) is coated on the surface of the substrate. Then the hydrolysis and the dehydration condensation polymerization are performed on the titanium compound at a temperature of 200° C. from room temperature. Therefore an amorphous titania thin film in which the tin oxide particulates are diffused is formed. Subsequently, the amorphous titania is heated in the range of titania crystallization temperature or more and the substrate softening point or less, and thus the amorphous titania is phase-shifted into the crystalline titania.

In a method of coating a titania-contained silicone coating material, there is used a coating material in which the titania (photocatalytic particulates) is diffused in film forming components made of the silicone precursor or a non-cured or partial-cured silicone (organopolysiloxane). In detail, the coating material is coated on the surface of the substrate, the film forming components are cured, and then the photocatalyst is photoexcited. In this case, an organic group combined with a silicon atom of a silicon molecule is replaced with a hydroxyl group by action of the photocatalyst, and a contact angle of the surface to the water approaches 0°. As a result, the surface is hydrophilized (a super-hydrophilizing). According to this method, it is possible to cure the film forming components in a comparative low temperature, it is possible to coat the film forming components again and again whenever necessary, and it is also possible to easily hydrophilize glass even in sun light.

In addition, in the on-vehicle camera lens, it is preferred that a hard coat film is formed on at least the first surface, which is close to the object point, of the first lens 1a.

The hard coat film, which is excellent in light resistance, antiweatherability, transparency, scratch resistance, surface hardness, abrasion resistance, heat resistance, and the like, is formed on a glass surface. In addition, the film is used as an optical thin film such as anti-reflective film, permselective film, ultraviolet shielding film, or the like. Such a hard coat film is formed by, for example, coating composition including: ultrafine particles of an composite oxide constituted of fine core particles, which are ultrafine particles of the rutile type titanium oxide, and cover layers, which include at least one kind of metal oxide, a sol thereof, or a curable binder component; and water or organic solvent. In addition, as the coating composition, it is possible to use a composition in which an alkoxysilane hydrolysate and $Nb_2O_5$ fine particles are stably diffused by an anionic based surfactant in a colloidal state. In addition, in the coating composition, to improve coatability and exterior appearance ability as occasion demands, there may be added a very small amount of ultraviolet absorbing agent (which is based on a benzotriazole based, a benzophenone based, or the like), an antioxidant, a disperse dye (water dispersion), an antistatic agent, and a surfactant (a non-ionic surfactant constituted of a hydrophobic group of dimethylsilicone oil and a hydrophilic group of polyester, or the like).

As a method of coating a glass having the hard coat film composition, it is possible to use a brush coating, a dip coating, a roller coating, a spray coating, a spin coating, or the like, after the glass is previously processed by an acid cleaning, an alkali cleaning, a defatting cleaning using a solvent, a plasma treatment, or an ultrasonic cleaning. A dry curing condition is, for example, in the range of 80° C. to 150° C., and preferably in the range of 100° C. to 120° C., for about 1 hour to 5 hours. In addition, a thickness of the cured hard coat film is appropriately selectable in the range of 0.5 μm to 20 μm.

In addition, between the glass and the hard coat film, it is preferred to provide a primer film. The primer film has a function of improving impact resistance and adhesiveness. In detail, in the primer composition, all or a main body of a film-forming resin is made of a thermoplastic polyurethane (TPU) or an ester based thermoplastic elastomer (TPEE). Examples thereof include a TPU base primer composition and a TPEE base primer composition configured so that the fine particles of the niobium oxide are diffused in the colloidal state.

In addition, in the on-vehicle camera lens, the hard coat film is formed and preferably the photocatalytic film is further formed on the first surface, which is close to the object point, of the first lens 1a.

However, in the on-vehicle camera lens, at least one surface of the plurality of lenses is formed as an aspheric surface. Therefore, it is possible to achieve improvements in characteristics such as a decrease in aberration, an increase in resolution, and the like.

EXAMPLES

Hereinafter, examples of the invention will be described.

Examples 1 to 5 and a comparative example of the on-vehicle camera lens glass material according to the invention are provided by the inventors as shown in the following Table 1.

TABLE 1

|  | Example 1 | Example 2 | Example 3 | Example 4 | Example 5 | Comparative Example |
|---|---|---|---|---|---|---|
| $SiO_2$ | 30.0 | 7.0 | 7.0 | 7.0 | 43.0 | 5.0 |
| $B_2O_3$ | 2.0 | 10.0 | 13.0 | 8.0 | 3.0 | 24.0 |

TABLE 1-continued

|  | Example 1 | Example 2 | Example 3 | Example 4 | Example 5 | Comparative Example |
|---|---|---|---|---|---|---|
| $Li_2O$ | 1.0 | 0.0 | 0.0 | 0.0 | 8.0 | 0.0 |
| CaO | 26.0 | 0.0 | 3.0 | 0.0 | 18.0 | 0.0 |
| BaO | 0.0 | 0.0 | 11.0 | 15.0 | 0.0 | 0.0 |
| ZnO | 0.0 | 5.0 | 4.0 | 1.0 | 0.0 | 23.0 |
| $La_2O_3$ | 3.0 | 41.0 | 38.0 | 34.0 | 3.0 | 38.0 |
| $Gd_2O_3$ | 0.0 | 10.0 | 0.0 | 0.0 | 0.0 | 0.0 |
| $Y_2O_3$ | 0.0 | 4.0 | 0.0 | 0.0 | 0.0 | 0.0 |
| $ZrO_2$ | 10.0 | 6.0 | 6.0 | 7.0 | 8.0 | 4.0 |
| $Nb_2O_5$ | 19.0 | 2.0 | 5.0 | 8.0 | 7.0 | 6.0 |
| $Ta_2O_5$ | 0.0 | 15.0 | 0.0 | 0.0 | 0.0 | 0.0 |
| $TiO_2$ | 9.0 | 0.0 | 13.0 | 20.0 | 10.0 | 0.0 |
| $SiO_2 + ZrO_2$ | 40.0 | 13.0 | 13.0 | 14.0 | 51.0 | 9.0 |
| $Nb_2O_5 + TiO_2$ | 28.0 | 2.0 | 18.0 | 28.0 | 17.0 | 6.0 |
| $Nb_2O_5 + TiO_2 + Ta_2O_5$ | 28.0 | 17.0 | 18.0 | 28.0 | 17.0 | 6.0 |
| nd | 1.807 | 1.885 | 1.805 | 2.000 | 1.702 | 1.786 |
| νd | 33.0 | 40.7 | 31.3 | 25.4 | 40.0 | 43.9 |
| specific gravity | 3.5 | 5.4 | 4.6 | 4.7 | 2.9 | 4.4 |
| $\alpha$ ($\times 10^{-7}$ °$C^{-1}$) | 88 | 60 | 88 | 87 | 98 | 71 |
| DW | 0.01% (1) | 0.01% (1) | 0.02% (1) | 0.01% (1) | 0.02% (1) | 0.02% (1) |
| DA | 0.02% (1) | 0.10% (1) | 0.15% (1) | 0.02% (1) | 0.03% (1) | 0.47% (3) |
| Hk | 685 (7) | 730 (7) | 630 (6) | 600 (6) | 670 (7) | 690 (7) |
| solarization | 0.8% | 0.5% | 0.8% | 0.8% | 0.8% | 0.5% |

($\alpha$: average linear expansion coefficient, DW: water resistance, DA: acid resistance, Hk: Knoop hardness, ( ) represents a grade thereof)

Using raw materials having purity of an optical glass, the raw materials such as an oxide, a hydroxide, a carbonate, a nitrate, a chloride, and a sulfate were precisely weighed so as to make the composition shown in Table 1. Then, the mixed raw material was put in a platinum melting pot, and was melted by being heated up to 1300° C. to 1500° C. Subsequently, the material was homogenized by being stirred with a stirring rod having a platinum vanes, was clarified by standing it, and the melted material was made to flow in a mold. The glass was solidified, and was moved to an electric furnace previously heated up to near an annealing point of the glass, and was gradually cooled down to room temperature.

Cutting a test piece for measurement from the obtained glass block, the respective characteristics (an average linear expansion coefficient $\alpha$, water resistance DW, acid resistance DA, Knoop hardness Hk, and solarization) were evaluated based on Japanese Optical Glass Industrial Standard mentioned above.

By using the on-vehicle camera lens glass material of the examples and the glass material of the comparative example, an anti-reflection (AR) coat was performed on a concave meniscus lens which has a diameter of 25 mm and a center thickness of 2 mm and was previously polished. Then, the on-vehicle camera lens was constituted of the lens as a first lens. The casing of the on-vehicle camera having the on-vehicle camera lens was dipped in an acid rain solution (sulfuric acid:nitric acid:hydrochloric acid=4:2:1) which has PH 4 and was artificially prepared. Temperature of the solution was set by 50° C. The sample was taken out after it was dipped for 1000 hours, and the surface of the lens was inspected. As a result, in the on-vehicle camera lens glass materials of the examples, there was no variation, but in the glass material of the comparative example, there was surface roughness, that is, a blurred shape formed on the surface.

In addition, a glass piece was cut from the obtained glass block, and the glass piece was processed into a press molding material. Then, the material was heated to be soften, and was press-molded in a shape similar to a lens by using a press molding tool. Subsequently, the press-molded product was grinded and polished, and a lens was manufactured.

In any methods mentioned above, the glass polishing process was required. Since Knoop hardness was high, the material was easy to be finished with a smooth lens surface and with high accuracy in shape. In addition, since an average linear expansion coefficient thereof was low, it was easy to prevent glass from being damaged in the grinding or the polishing process. In addition, all of examples of the on-vehicle camera lens glass materials have excellent acid resistance and water resistance. Therefore, it was possible to prevent so-called staining and dimming phenomenon caused after polishing and cleaning process.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. An on-vehicle camera lens glass material for use in an on-vehicle camera lens,
   wherein the on-vehicle camera lens glass material is configured such that a measurement result of acid resistance based on a powder method prescribed by Japanese Optical Glass Industrial Standard, is $1^{st}$ Class or $2^{nd}$ Class; and
   wherein the on-vehicle camera lens glass material contains:
   0.1 to 45% by weight of $SiO_2$;
   0.1 to 25% by weight of $B_2O_3$;
   0.1 to 20% by weight of $ZrO_2$;
   0 to 50% by weight of $La_2O_3$;
   0 to 30% by weight of $Nb_2O_5$; and
   the on-vehicle lens glass material satisfies at least one of following conditions:
   a measurement result of Knoop hardness based on a measurement method prescribed by Japanese Optical Glass Industrial Standard, is $6^{th}$ Class or higher; and a measurement result of solarization based on a measurement method prescribed by Japanese Optical Glass Industrial Standard, is 2% or less.

2. The on-vehicle camera lens glass material according to claim 1,
wherein the on-vehicle camera lens glass material additionally satisfies at least one of following conditions:
a measurement result of water resistance based on a powder method prescribed by Japanese Optical Glass Industrial Standard, is $1^{st}$ Class; and
a measurement result of average linear expansion coefficient based on a measurement method prescribed by Japanese Optical Glass Industrial Standard, is $100 \times 10^{-7}$ °C.$^{-1}$ or less.

3. The on-vehicle camera lens glass material according to claim 1, wherein the on-vehicle camera glass material includes a total content of $SiO_2$ and $ZrO_2$ that is 10% by weight or more.

4. The on-vehicle camera lens glass material according to claim 1, wherein the on-vehicle camera glass material includes transparent crystallized glass.

5. The on-vehicle camera lens glass material according to claim 1, wherein the on-vehicle camera glass material includes a total content of $TiO_2$, $Nb_2O_5$, $Ta_2O_5$, and $ZrO_2$ that is 20% by weight or more.

6. The on-vehicle camera lens glass material according to claim 1, wherein the on-vehicle camera glass material further contains:
at least one of $Al_2O_3$, $Li_2O$, $Na_2O$, $K_2O$, MgO, CaO, SrO, BaO, ZnO, $TiO_2$, $La_2O_3$, $Gd_2O_3$, $Y_2O_3$, $Ta_2O_5$, $WO_3$, $Sb_2O_3$, $SnO_2$, and F.

7. The on-vehicle camera lens glass material according to claim 1, wherein of the on-vehicle camera lens glass a refractive index material with respect to line d is 1.70 or more.

8. An on-vehicle camera lens, wherein at least a first lens close to an object point is made of the on-vehicle camera lens glass material, according to claim 1.

9. The on-vehicle camera lens according to claim 8, wherein a photocatalytic film is formed on at least a first surface, which is close to the object point, of the first lens.

10. The on-vehicle camera lens according to claim 8, wherein a hard coat film is formed on at least a first surface, which is close to the object point, of the first lens.

11. The on-vehicle camera lens according to claim 8, wherein a hard coat film and a photocatalytic film are formed on at least a first surface of the first lens, which is close to the object point.

12. The on-vehicle camera lens according to claim 8, wherein at least one surface of the first lens is formed as an aspheric surface.

13. An on-vehicle camera lens glass material for use in an on-vehicle camera lens, wherein the on-vehicle camera lens glass material is configured such that
a total content of $CeO_2$ and $Fe_2O_3$ is in a range of 0.1 to 1% by weight; and
wherein the material contains:
0.1 to 45% by weight of $SiO_2$;
0.1 to 25% by weight of $B_2O_3$;
0.1 to 20% by weight of $ZrO_2$;
0 to 50% by weight of $La_2O_3$; and
0 to 30% by weight of $Nb_2O_5$.

14. The on-vehicle camera lens glass material according to claim 13, wherein a refractive index of the on-vehicle camera lens glass material with respect to line d is 1.70 or more.

15. An on-vehicle camera lens, wherein at least a first lens close to an object point is made of the on-vehicle camera lens glass material, according to claim 13.

16. The on-vehicle camera lens according to claim 15, wherein a photocatalytic film is formed on at least a first surface, which is close to the object point, of the first lens.

17. The on-vehicle camera lens according to claim 15, wherein a hard coat film is formed on at least a first surface, which is close to the object point, of the first lens.

18. The on-vehicle camera lens according to claim 15, wherein a hard coat film and a photocatalytic film are formed on at least a first surface of the first lens, which is close to the object point.

19. The on-vehicle camera lens according to claim 15, wherein at least one surface of the first lens is formed as an aspheric surface.

* * * * *

(12) EX PARTE REEXAMINATION CERTIFICATE (9707th)
United States Patent
Hachitani et al.

(10) Number: US 8,077,406 C1
(45) Certificate Issued: Jun. 13, 2013

(54) ON-VEHICLE CAMERA LENS GLASS MATERIAL AND ON-VEHICLE CAMERA LENS

(75) Inventors: Yoichi Hachitani, Tokyo (JP); Kazuo Tachiwana, Tokyo (JP)

(73) Assignee: Hoya Corporation, Shinjuku-Ku, Tokyo (JP)

Reexamination Request:
No. 90/012,563, Sep. 14, 2012

Reexamination Certificate for:
Patent No.: 8,077,406
Issued: Dec. 13, 2011
Appl. No.: 12/050,985
Filed: Mar. 19, 2008

(51) Int. Cl.
*G02B 3/00* (2006.01)

(52) U.S. Cl.
USPC .......................................................... 359/809

(58) Field of Classification Search
None
See application file for complete search history.

(56) References Cited

To view the complete listing of prior art documents cited during the proceeding for Reexamination Control Number 90/012,563, please refer to the USPTO's public Patent Application Information Retrieval (PAIR) system under the Display References tab.

*Primary Examiner* — Christina Y Leung

(57) ABSTRACT

An on-vehicle camera lens glass material satisfies at least one of conditions in which a measurement result in water resistance based on a powder method prescribed by Japanese Optical Glass Industrial Standard is $1^{st}$ Class, a measurement result in Knoop hardness based on a measurement method prescribed by Japanese Optical Glass Industrial Standard is $6^{th}$ Class or higher, a measurement result in solarization based on a measurement method prescribed by Japanese Optical Glass Industrial Standard is 2% or less, and a measurement result in average linear expansion coefficient based on a measurement method prescribed by Japanese Optical Glass Industrial Standard is $100 \times 10^{-7}$ $°C.^{-1}$ or less.

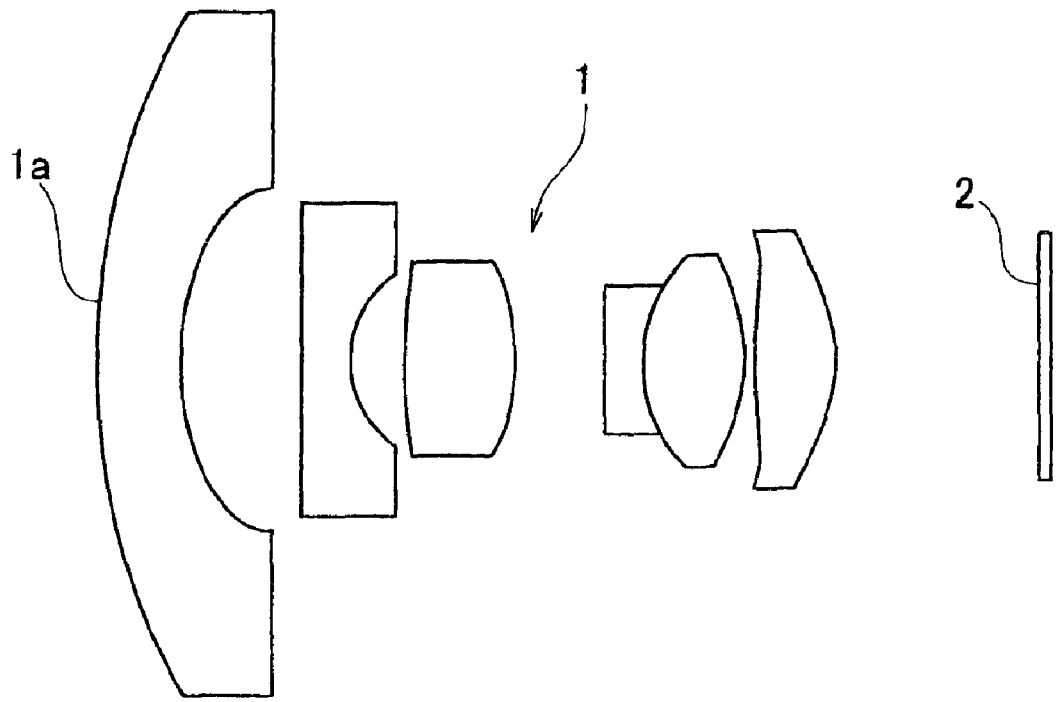

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 13 are determined to be patentable as amended.

Claims 3-12 and 14-19, dependent on an amended claim, are determined to be patentable.

1. An on-vehicle camera lens glass material for use in an on-vehicle camera lens, wherein the on-vehicle camera lens glass material is configured such that a measurement result of acid resistance based on a powder method prescribed by Japanese Optical Glass Industrial Standard, is $1^{st}$ Class or $2^{nd}$ Class; and
   wherein the on-vehicle camera lens glass material contains:
   0.1 to 45% by weight of $SiO_2$;
   0.1 to 25% by weight of $B_2O_3$;
   0.1 to 20% by weight of $ZrO_2$;
   0 to 50% by weight of $La_2O_3$;
   0 to 30% by weight of $Nb_2O_5$; and
   the on-vehicle lens glass material satisfies [at least one of] *a* following [conditions] *condition*:
   [a measurement result of Knoop hardness based on a measurement method prescribed by Japanese Optical Glass Industrial Standard, is $6^{th}$ Class or higher; and]
   a measurement result of solarization based on a measurement method prescribed by Japanese Optical Glass Industrial Standard, is 2% or less.

2. The on-vehicle camera lens glass material according to claim 1,
   wherein the on-vehicle camera lens glass material additionally satisfies [at least one of] *a* following [conditions] *condition*:
   a measurement result of water resistance based on a powder method prescribed by Japanese Optical Glass Industrial Standard, is $1^{st}$ Class[; and
   a measurement result of average linear expansion coefficient based on a measurement method prescribed by Japanese Optical Glass Industrial Standard, is $100 \times 10^{-7}$ °$C^{-1}$ or less].

13. An on-vehicle camera lens glass material for use in an on-vehicle camera lens, wherein the on-vehicle camera lens glass material is configured such that
    a total content of $CeO_2$ and $Fe_2O_3$ is in a range of 0.1 to 1% by weight; and wherein the material contains:
    0.1 to 45% by weight of $SiO_2$;
    0.1 to 25% by weight of $B_2O_3$;
    0.1 to 20% by weight of $ZrO_2$;
    0 to 50% by weight of $La_2O_3$; [and]
    0 to 30% by weight of $Nb_2O_5$; *and*
    *the on-vehicle camera lens glass material satisfies a following condition;*
    *a measurement result of solarization based on a measurement method prescribed by Japanese Optical Glass Industrial Standard, is 2% or less.*

* * * * *